(12) United States Patent
Sinusas et al.

(10) Patent No.: US 11,718,390 B2
(45) Date of Patent: Aug. 8, 2023

(54) PROPULSION SYSTEMS FOR ROTORCRAFT

(71) Applicant: Textron Innovations Inc., Providence, RI (US)

(72) Inventors: Eric A. Sinusas, Euless, TX (US); Erik John Oltheten, Fort Worth, TX (US); Carlos Alexander Fenny, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 440 days.

(21) Appl. No.: 17/076,399

(22) Filed: Oct. 21, 2020

(65) Prior Publication Data
US 2021/0031908 A1 Feb. 4, 2021

Related U.S. Application Data

(63) Continuation of application No. 15/909,246, filed on Mar. 1, 2018, now abandoned.

(51) Int. Cl.
*B64C 27/08* (2023.01)
*B64C 27/20* (2023.01)
(Continued)

(52) U.S. Cl.
CPC .............. *B64C 27/08* (2013.01); *B64C 27/00* (2013.01); *B64C 27/20* (2013.01); *B64C 27/82* (2013.01); *B64C 2027/8281* (2013.01)

(58) Field of Classification Search
CPC . B64C 27/08; B64C 27/00; B64C 2027/8281; B64C 2027/4733
(Continued)

(56) References Cited

U.S. PATENT DOCUMENTS 2,318,260 A * 5/1943 Sikorsky ................. B64C 27/04
416/123
2,330,204 A * 9/1943 Campbell ............... B64C 27/82
244/17.23
(Continued)

FOREIGN PATENT DOCUMENTS

CN 104973241 A 10/2015
CN 205229808 U 5/2016
(Continued)

OTHER PUBLICATIONS

Chinese Exam Report; Application No. 201910154777.6, China National Intellectual Property Administration; dated May 7, 2022.
(Continued)

*Primary Examiner* — Christopher P Ellis
(74) *Attorney, Agent, or Firm* — Lawrence Youst PLLC (57) ABSTRACT

A propulsion system for a rotorcraft includes a first fan assembly including a plurality of first fan blades, a second fan assembly including a plurality of second fan blades and a drive system adapted to provide torque to the first and second fan blades. The first fan blades have a larger rotational inertia than the second fan blades. The second fan blades are adapted to experience a larger angular acceleration than the first fan blades in response to torque from the drive system, thereby providing responsive thrust control for the rotorcraft.

20 Claims, 8 Drawing Sheets

(51) Int. Cl.
*B64C 27/82* (2006.01)
*B64C 27/00* (2006.01)
(58) Field of Classification Search
USPC ..................................................... 244/17.23
See application file for complete search history.

(56) References Cited

U.S. PATENT DOCUMENTS

| | | | |
|---|---|---|---|
| 2,514,822 A | 7/1950 | Wolfe | |
| 2,670,804 A * | 3/1954 | Campbell | B64C 27/605 416/114 |
| 2,672,939 A * | 3/1954 | Campbell | B64C 27/82 416/115 |
| 3,345,016 A | 10/1967 | Eickmann | |
| 3,614,029 A | 10/1971 | Eickmann | |
| 3,632,065 A * | 1/1972 | Rosta | B64C 27/20 244/17.11 |
| 3,801,046 A | 4/1974 | Eickmann | |
| 3,986,686 A * | 10/1976 | Girard | B64C 27/24 416/170 R |
| 4,765,567 A * | 8/1988 | Gutman | B64C 39/024 273/362 |
| 4,768,737 A * | 9/1988 | Broadley | B64C 27/82 244/6 |
| 4,856,732 A * | 8/1989 | Eickmann | B64D 35/00 244/66 |
| 5,746,390 A | 5/1998 | Chiappetta | |
| 7,011,274 B1 | 3/2006 | Hardoin | |
| 7,032,860 B1 | 4/2006 | Kirk et al. | |
| 8,583,295 B2 | 11/2013 | Eglin et al. | |
| 10,377,479 B2 | 8/2019 | Parsons et al. | |
| 10,703,471 B2 | 7/2020 | Fenny et al. | |
| 10,796,275 B1 * | 10/2020 | Wilkins | G06Q 10/087 |
| 11,572,160 B1 * | 2/2023 | Nielsen | B64U 30/299 |
| 2004/0245376 A1 | 12/2004 | Muren | |
| 2007/0034739 A1 | 2/2007 | Yoeli | |
| 2007/0095973 A1 * | 5/2007 | Challis | B64C 27/22 244/17.21 |
| 2011/0121128 A1 | 5/2011 | Balkus, Jr. et al. | |
| 2013/0205941 A1 | 8/2013 | Fanose | |
| 2013/0206915 A1 | 8/2013 | Desaulniers | |
| 2014/0091172 A1 | 4/2014 | Arlton et al. | |
| 2015/0001337 A1 | 1/2015 | McCollough et al. | |
| 2015/0012154 A1 | 1/2015 | Senkel et al. | |
| 2016/0236775 A1 | 8/2016 | Eshkenazy et al. | |
| 2016/0280369 A1 | 9/2016 | Pounds | |
| 2017/0113793 A1 * | 4/2017 | Toulmay | B64C 27/22 |
| 2017/0253326 A1 * | 9/2017 | Mullins | B64C 27/14 |
| 2017/0349274 A1 | 12/2017 | Fenny et al. | |
| 2017/0349276 A1 | 12/2017 | Fenny | |
| 2018/0029703 A1 | 2/2018 | Simon et al. | |
| 2018/0057157 A1 | 3/2018 | Groninga et al. | |
| 2018/0222579 A1 * | 8/2018 | Simon | B64C 27/473 |
| 2019/0071172 A1 | 3/2019 | Caldwell | |
| 2019/0337612 A1 * | 11/2019 | Carter, Jr. | B64C 27/08 |
| 2020/0277054 A1 * | 9/2020 | Lee | B64C 27/08 |
| 2022/0001977 A1 * | 1/2022 | Netzer | B64C 29/0033 |
| 2022/0244744 A1 * | 8/2022 | Alholm | G05D 1/106 |
| 2022/0306284 A1 * | 9/2022 | Howe | B64F 1/125 |

FOREIGN PATENT DOCUMENTS

| | | | | |
|---|---|---|---|---|
| CN | 207791151 U | * | 8/2018 | |
| CN | 109153448 A | * | 1/2019 | B64C 27/08 |
| CN | 109625259 A | * | 4/2019 | B64C 27/08 |
| CN | 110254704 A | * | 9/2019 | |
| CN | 111874220 A | * | 11/2020 | B64C 1/22 |
| CN | 115667071 A | * | 1/2023 | |
| DE | 102005046155 A1 | | 4/2007 | |
| EP | 2394914 A1 | | 12/2011 | |
| EP | 3501983 A1 | | 6/2019 | |
| GB | 2243132 A | * | 10/1991 | B64C 27/08 |
| GB | 2432348 A | * | 5/2007 | B64C 27/006 |
| JP | H07156890 A | | 6/1995 | |
| JP | H09175495 A | | 7/1997 | |
| JP | 2009051465 A | | 3/2009 | |
| JP | 2009090755 A | | 4/2009 | |
| JP | 6997929 B1 | * | 1/2022 | |
| JP | 2022107078 A | * | 7/2022 | |
| KR | 20150052578 A | * | 5/2015 | |
| KR | 20130093867 A | * | 4/2016 | |
| RU | 181389 U1 | * | 7/2018 | B64C 27/08 |
| WO | WO-2015061857 A1 | * | 5/2015 | A63H 27/00 |
| WO | WO-2016164280 A1 | * | 10/2016 | B64C 27/08 |
| WO | WO-2016193690 A1 | * | 12/2016 | B64C 25/10 |
| WO | WO-2021166140 A1 | * | 8/2021 | |
| WO | WO-2022000198 A1 | * | 1/2022 | |

OTHER PUBLICATIONS

Besse et al.; RTM Technology for Fenestron Blade; Eurocopter; Jan. 1997.
Composites Take Off at Paris Air Show; Reinforced Plastics; Oct. 1995.
European Exam Report; Application No. EP 18216007.7; European Patent Office; dated May 28, 2019.
European Exam Report; Application No. EP 18216007.7; European Patent Office; dated Sep. 9, 2019.
European Search Report; Application No. EP 18216007.7; European Patent Office; dated May 14, 2019.
Janker et al.; Helicopter Hybridisation—The Key for Drastic Reductions of Fuel Burn and Emissions; American Helicopter Society; May 3-5, 2011.

* cited by examiner

PROPULSION SYSTEMS FOR ROTORCRAFT

CROSS-REFERENCE TO RELATED APPLICATIONS

The present application is a continuation of co-pending application Ser. No. 15/909,246 filed Mar. 1, 2018.

TECHNICAL FIELD OF THE DISCLOSURE

The present disclosure relates, in general, to propulsion systems operable for use on rotorcraft and, in particular, to propulsion systems including two or more fans having different rotational inertias to meet the thrust, responsiveness, handling and other requirements of the rotorcraft.

BACKGROUND

The main fan, or rotor, of a helicopter produces the vertical lift necessary for flight. One consideration regarding the performance of a main fan is the main fan's capability to output sufficient propulsion thrust to maintain flight throughout all operational conditions. For example, the main fan may be required to output a higher thrust during takeoff or when performing certain maneuvers. In such circumstances, the main fan may be required to output thrust at or near its maximum capabilities. Another consideration regarding the performance of the main fan is its responsiveness when changing or correcting the helicopter's propulsion thrust. Ideally, a main fan should be able to change speed rapidly to quickly and precisely control the helicopter's thrust, thereby meeting the helicopter's handling requirements. Current fans, including both fixed and variable rotational speed systems, face difficulties in meeting both the thrust and responsiveness requirements mentioned above. For example, while a large main fan may be able to easily meet the maximum propulsion thrust requirements for flight, the correspondingly large rotational inertia of the main fan may hinder its responsiveness when quick thrust adjustments are necessary. Conversely, a smaller main fan having a lower rotational inertia can more easily meet responsiveness requirements, but may be unable to output the propulsion thrust required by the helicopter in all operational conditions. Accordingly, the need has arisen for an improved propulsion system that is capable of meeting the thrust, responsiveness, handling, cost and other performance requirements of rotorcraft.

SUMMARY

In a first aspect, the present disclosure is directed to a propulsion system for a rotorcraft including a first fan assembly including a plurality of first fan blades, a second fan assembly including a plurality of second fan blades and a drive system adapted to provide torque to the first and second fan blades. The first fan blades have a larger rotational inertia than the second fan blades. The second fan blades are adapted to experience a larger angular acceleration than the first fan blades in response to torque from the drive system, thereby providing responsive thrust control for the rotorcraft.

In some embodiments, the first and second fan blades may include fixed pitch fan blades. In certain embodiments, the first fan blades may be longer than the second fan blades. In some embodiments, the first fan blades may be formed from a different material than the second fan blades. In certain embodiments, the plurality of first fan blades may include a larger number of fan blades than the plurality of second fan blades. In some embodiments, the first fan blades may be wider than the second fan blades. In certain embodiments, the first fan blades may include a circumferential tip ring. In some embodiments, the first and/or second fan assemblies may be open or shrouded. In certain embodiments, the first fan blades may be adapted to provide a larger maximum thrust than the second fan blades. In some embodiments, the first and second fan assemblies may provide vertical lift thrust for the rotorcraft. In certain embodiments, the first fan blades may be adapted to autorotate in response to descent of the rotorcraft while zero torque is provided by the drive system. In some embodiments, the drive system may include first and second motors. In such embodiments, the first fan assembly may include the first motor and the second fan assembly may include the second motor. In certain embodiments, the drive system may include an engine and a motor. In such embodiments, the engine may provide rotational energy to the first fan assembly and the motor may provide rotational energy to the second fan assembly. In some embodiments, the drive system may include an electric motor, a hydraulic motor or a variable speed motor.

In a second aspect, the present disclosure is directed to a rotorcraft including a fuselage and a propulsion system coupled to the fuselage. The propulsion system includes a first fan assembly including a plurality of first fan blades, a second fan assembly including a plurality of second fan blades and a drive system adapted to provide torque to the first and second fan blades. The first fan blades have a larger rotational inertia than the second fan blades. The second fan blades are adapted to experience a larger angular acceleration than the first fan blades in response to torque from the drive system, thereby providing responsive thrust control for the rotorcraft.

In some embodiments, the second fan assembly may include a plurality of second fan assemblies, such as four or more fan assemblies. In certain embodiments, the first fan assembly may include a central fan assembly including a mast, and the second fan assemblies may be radially symmetric about the mast of the central fan assembly. In some embodiments, the central fan assembly may form a rotor disk and the second fan assemblies may be disposed outboard of or underneath the rotor disk of the central fan assembly. In certain embodiments, the first fan blades of the central fan assembly may include variable pitch fan blades, and the second fan blades of the second fan assemblies may include fixed pitch fan blades. In some embodiments, the drive system may include an engine and a motor. In such embodiments, the engine may provide rotational energy to the central fan assembly, and the motor may provide rotational energy to the second fan assemblies. Also in such embodiments, the second fan assemblies may each include a respective motor. In certain embodiments, the rotorcraft may include first and second wings supported by the fuselage, the first and second wings each having an outboard end. In such embodiments, the first fan assembly may include a plurality of first fan assemblies each coupled to the outboard end of a respective one of the first or second wings, and the plurality of first fan assemblies may each be tiltable relative to the fuselage. In some embodiments, the plurality of first fan assemblies may include a plurality of first shrouded fan assemblies. In certain embodiments, the rotorcraft may include a closed wing disposed about the fuselage. In such embodiments, the first fan assembly may be rotatably coupled to the fuselage, and the second fan assembly may include a plurality of second fan assemblies each rotatably coupled to the closed wing. In some embodiments, the rotorcraft may include a flight control computer including a thrust controller in communication with the first and second fan assemblies. The thrust controller may be operable to control the thrust of the rotorcraft using the first and second fan assemblies. In certain embodiments, the thrust controller may include a thrust determination module operable to determine a thrust adjustment for the rotorcraft and a fan control module operable to modify the thrust of the rotorcraft using the first and second fan assemblies.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a rotorcraft is schematically illustrated and generally designated 10. Rotorcraft 10 includes a fuselage 12, from which tailboom 14 extends. A tail rotor 16 rotatably coupled to the aft portion of tailboom 14 controls the yaw of rotorcraft 10. A landing gear system 18 provides ground support for rotorcraft 10. Helicopters have traditionally relied upon a single main fan, or rotor, located atop fuselage 12 to provide propulsion. As used herein, including in the claims, a fan may include a fixed pitch, variable rotational speed rotor system and/or a variable pitch, fixed rotational speed rotor system. A single fan, however, compromises the maximum thrust and responsiveness requirements of the helicopter. In particular, a large fan may be capable of providing sufficient propulsion thrust in all operational circumstances, but may be unable to manage the propulsion thrust or orientation of rotorcraft 10 in a sufficiently responsive manner by virtue of the fan's high rotational inertia, thereby adversely affecting the handling and maneuverability of rotorcraft 10. Conversely, a small fan with a low rotational inertia may be sufficiently responsive, but unable to meet the thrust demands of the helicopter in some operational circumstances, such as during takeoff.

To address these and other deficiencies of current helicopters, rotorcraft 10 includes a propulsion system 20 coupled to fuselage 12. Propulsion system 20 includes a central fan assembly 22 and four fan assemblies 24a, 24b, 24c, 24d disposed outboard of, and in substantially the same plane as, rotor disk 26 of central fan assembly 22. Central fan assembly 22 and fan assemblies 24a, 24b, 24c, 24d may provide vertical lift or other directional thrusts for rotorcraft 10. Central fan assembly 22 includes a motor 28 that provides torque to fan blades 30. Fan assemblies 24a, 24b, 24c, 24d each include a motor 32a, 32b, 32c, 32d that provides torque to fan blades 34a, 34b, 34c, 34d, respectively. Fan blades 30, 34a, 34b, 34c, 34d may be fixed pitch fan blades and motors 28, 32a, 32b, 32c, 32d may be variable speed motors capable of producing a wide range of revolutions per minute (RPM). Fan assemblies 24a, 24b, 24c, 24d are radially symmetric about mast 36 of central fan assembly 22, although non-symmetric configurations are also within the scope of the illustrative embodiments.

Fan blades 30 of central fan assembly 22 have a larger rotational inertia, or moment of inertia or angular mass, than fan blades 34a, 34b, 34c, 34d of fan assemblies 24a, 24b, 24c, 24d. In the illustrated embodiment, fan blades 30 have a larger rotational inertia by virtue of being longer than fan blades 34a, 34b, 34c, 34d. Fan blades 30 thus form a larger rotor disk 26, in terms of area and diameter, than each of rotor disks 38a, 38b, 38c, 38d of fan blades 34a, 34b, 34c, 34d. Because fan blades 34a, 34b, 34c, 34d are shorter than fan blades 30, fan blades 34a, 34b, 34c, 34d are adapted to experience a larger angular acceleration in response to torque from motors 32a, 32b, 32c, 32d than that experienced by fan blades 30 in response to torque from motor 28. On the other hand, fan blades 30 are capable of producing a larger maximum thrust than the maximum thrust produced by each set of fan blades 34a, 34b, 34c, 34d. In this manner, propulsion system 20 provides responsive control, handling and maneuverability for rotorcraft 10 using fan assemblies 24a, 24b, 24c, 24d while remaining capable of providing the propulsion thrust required in all operational circumstances using central fan assembly 22. Central fan assembly 22 is capable of moving a higher air volume and/or may be more efficient in outputting thrust by virtue of having a higher inertia. However, fan assemblies 24a, 24b, 24c, 24d may respond more quickly to control inputs 40 from the pilot or from elsewhere, and be able to change speed rapidly for finer control of rotorcraft 10. The smaller diameters of fan assemblies 24a, 24b, 24c, 24d also reduce the tip speed, and therefore noise, of rotating fan blades 34a, 34b, 34c, 34d. Thus, fan assemblies 24a, 24b, 24c, 24d may be utilized when a reduced noise environment is preferable, such as during air reconnaissance or clandestine operations. Propulsion system 20 also provides a redundancy advantage by, for example, allowing fan assemblies 24a, 24b, 24c, 24d to be utilized for propulsion thrust in the event that central fan assembly 22 fails. Fan assemblies 24a, 24b, 24c, 24d allow for a more nimble rotorcraft 10, while higher inertia central fan assembly 22 helps to efficiently provide a high thrust for maximum payload carrying capacity. By utilizing fan assemblies 24a, 24b, 24c, 24d for quicker and/or finer thrust or propulsion adjustments and central fan assembly 22 to achieve a higher maximum thrust, propulsion system 20 is able to utilize two or more fans, such as five fans in the illustrated embodiment, to achieve optimal responsiveness, maximum thrust and cost in managing the thrust of rotorcraft 10.

Motors 28, 32a, 32b, 32c, 32d are part of a drive system of rotorcraft 10 that provides rotational energy to propulsion system 20. While motors 28, 32a, 32b, 32c, 32d are variable speed motors capable of having a large range of RPM settings, in other embodiments motors 28, 32a, 32b, 32c, 32d may be fixed speed or other types of motors. For example, any one or more of motors 28, 32a, 32b, 32c, 32d may be a stacked motor assembly in which two or more motors are stacked end-to-end and drive a single driveshaft to provide torque for a respective fan assembly. Any one or more of motors 28, 32a, 32b, 32c, 32d may be an electric motor, hydraulic motor or mechanically-driven motor. In other embodiments, the drive system of rotorcraft 10 may include an engine (not shown) that provides rotational energy to central fan assembly 22, and motors 32a, 32b, 32c, 32d may be electrical or hydraulic motors that provide rotational energy to fan assemblies 24a, 24b, 24c, 24d. In such embodiments, the central fan assembly 22 may rotate at a substantially fixed speed and fan blades 30 may be variable pitch fan blades while fan assemblies 24a, 24b, 24c, 24d may rotate at a variable speed and fan blades 34a, 34b, 34c, 34d may be fixed pitch fan blades. Propulsion system 20 may utilize any number of motors or engines to drive the fan assemblies included therein. For example, propulsion system 20 may include a single motor or engine that drives all fan assemblies 22, 24a, 24b, 24c, 24d.

Fan assemblies 22, 24a, 24b, 24c, 24d are each open fan assemblies. In other embodiments, any one or more of fan assemblies 22, 24a, 24b, 24c, 24d may be shrouded, or ducted, fan assemblies. The rotational inertia of fan blades 30 of central fan assembly 22 may be large enough to allow fan blades 30 to autorotate in response to a high rate, underpowered or uncontrolled descent of rotorcraft 10 while zero or little torque is provided by motor 28. Rotorcraft 10 may thus retain the autorotation capabilities of traditional helicopters. In other embodiments, fan assemblies 24a, 24b, 24c, 24d may be high inertia fan assemblies and central fan assembly 22 may be a lower inertia fan assembly. In other embodiments, fan assembly 22 may not be centrally located relative to fan assemblies 24a, 24b, 24c, 24d, but instead form a different configuration, symmetrical or non-symmetrical, with fan assemblies 24a, 24b, 24c, 24d. Also, while fan assemblies 24a, 24b, 24c, 24d are each supported by a respective crane 42a, 42b, 42c, 42d coupled to the top of fuselage 12, fan assemblies 24a, 24b, 24c, 24d may be coupled to fuselage 12 or central fan assembly 22 in any manner. In some embodiments, cranes 42a, 42b, 42c, 42d may be moveably, rotatably or telescopically coupled to fuselage 12 to allow for the movement of fan assemblies 24a, 24b, 24c, 24d relative to fuselage 12.

Rotorcraft 10 includes a flight control computer 44. In some embodiments, flight control computer 44 includes a thrust controller 46 that controls the thrust of rotorcraft 10 using fan assemblies 22, 24a, 24b, 24c, 24d. Thrust controller 46 may be in mechanical, electrical, wireless, computer or any other type of communication 48 with fan assemblies 22, 24a, 24b, 24c, 24d. Thrust controller 46 includes a thrust determination module 50 to determine an amount by which to change or correct the thrust, including orientation, of rotorcraft 10. In determining the thrust adjustment for rotorcraft 10, thrust determination module 50 may include and utilize any number or combination of the following sensors: a ram air sensor, downwash sensor, airspeed sensor, altitude sensor, attitude sensor, wind velocity sensor, cyclic control position sensor, collective control position sensor, roll rate sensor, yaw rate sensor, pitch rate sensor, acceleration sensor, such as a normal, lateral and/or longitudinal acceleration sensor, swashplate angle sensor, rotor flapping sensor, mechanical failure sensor, health monitoring system, descent rate sensor, traffic alert sensor or any other sensor suitable to perform the illustrative embodiments disclosed herein. Thrust controller 46 also includes a fan control module 52 to modify the thrust of rotorcraft 10 using fan assemblies 22, 24a, 24b, 24c, 24d. Fan control module 52 may determine the thrust magnitude of each fan assembly 22, 24a, 24b, 24c, 24d that is required to achieve the desired orientation or thrust of rotorcraft 10 as determined by thrust determination module 50. Fan control module 52 may also determine how quickly thrust must be implemented so that the desired orientation or thrust is achieved in a timely manner. Fan control module 52 may thus determine whether and how fast to rotate each fan assembly 22, 24a, 24b, 24c, 24d, taking into account that central fan assembly 22 has a higher rotational inertia, and thus a lower angular acceleration, than fan assemblies 24a, 24b, 24c, 24d. In one non-limiting example, thrust determination module 50 may determine that a thrust is needed to quickly balance the roll of rotorcraft 10, and fan control module 52 may activate fan assemblies 24c and 24d to quickly adjust the roll of rotorcraft 10. In another example, thrust determination module 50 may determine that a thrust is needed to level the pitch of rotorcraft 10, and fan control module 52 may activate fan assemblies 24a and 24d to quickly adjust the pitch of rotorcraft 10. Thrust controller 46 thus enhances the handling, maneuverability and controllability of rotorcraft 10 by selectively activating fan assemblies 22, 24a, 24b, 24c, 24d depending on the thrust and responsiveness requirements of the operational circumstance.

It should be appreciated that rotorcraft 10 is merely illustrative of a variety of aircraft that can implement the embodiments disclosed herein. Indeed, propulsion system 20 may be implemented on any aircraft with two or more fans or rotors. Other aircraft implementations can include hybrid aircraft, tiltrotor aircraft, tiltwing aircraft, quad tiltrotor aircraft, unmanned aircraft, gyrocopters, airplanes, helicopters and the like. Propulsion system 20 may also be utilized on any rotorcraft having a distributed propulsion system with two or more rotors powered by an electrical, hydraulic, mechanical or other energy source. As such, those skilled in the art will recognize that propulsion system 20 can be integrated into a variety of aircraft configurations. It should be appreciated that even though aircraft are particularly well-suited to implement the embodiments of the present disclosure, non-aircraft vehicles and devices can also implement the embodiments.

Figure 1A:
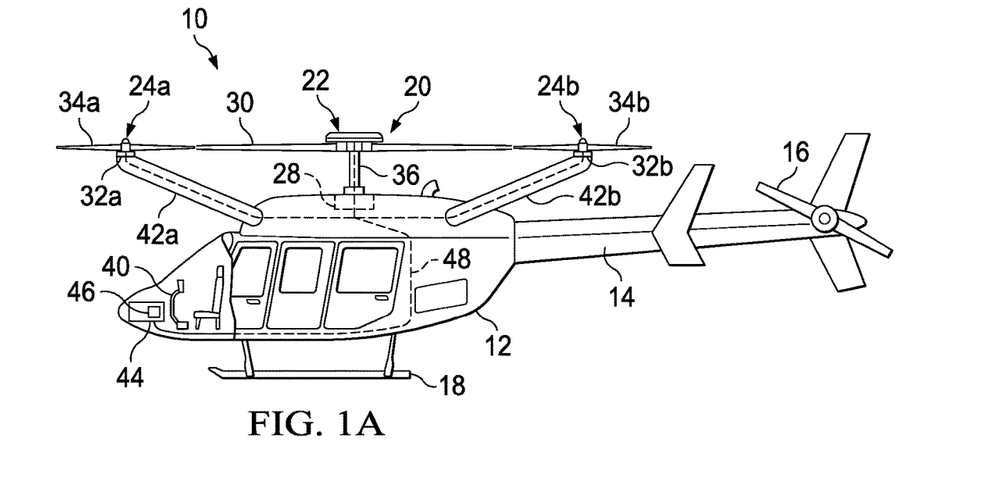
FIGS. 1A-1D are schematic illustrations of a rotorcraft including a propulsion system in accordance with embodiments of the present disclosure.
Figure 1B:
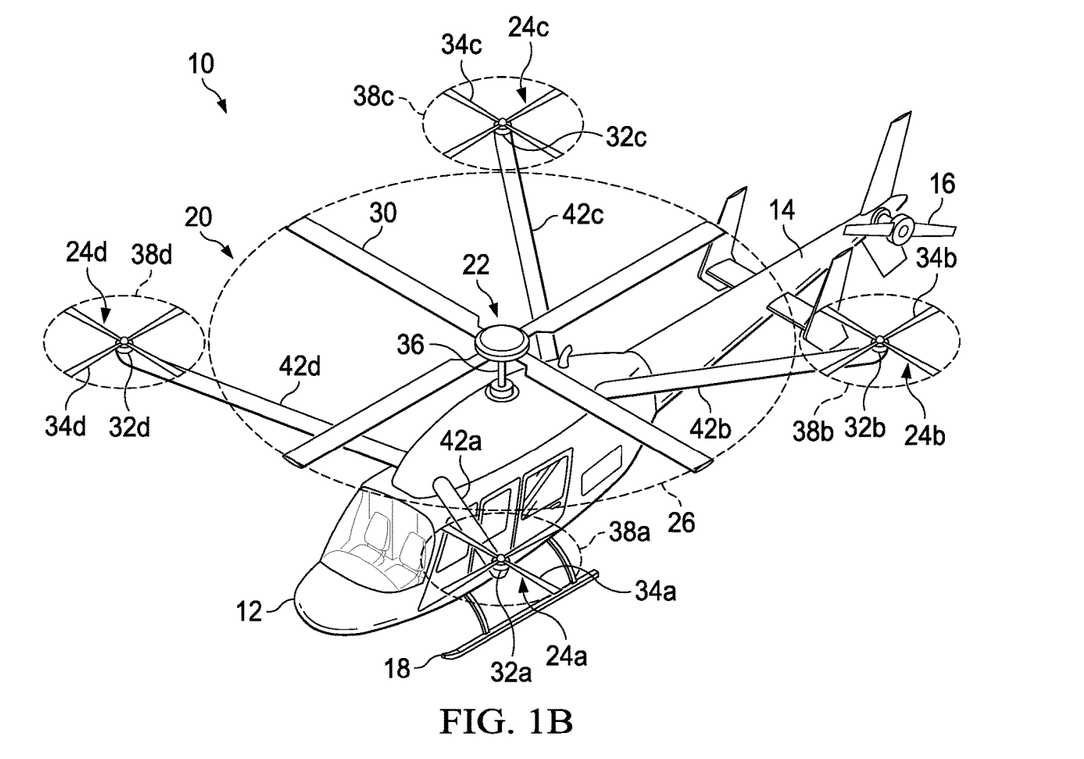
Figures 1C, 1D:
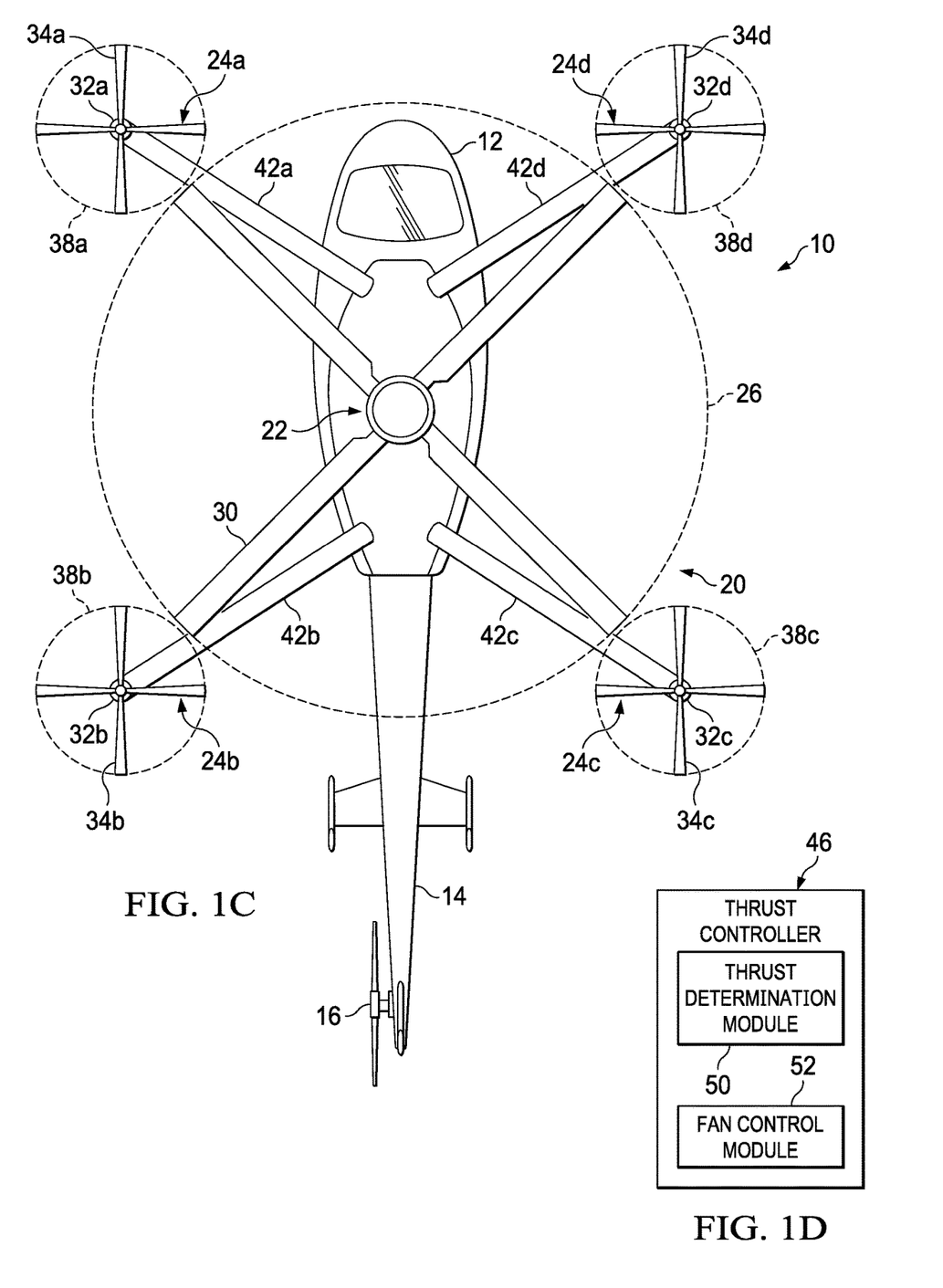
Figure 2A:
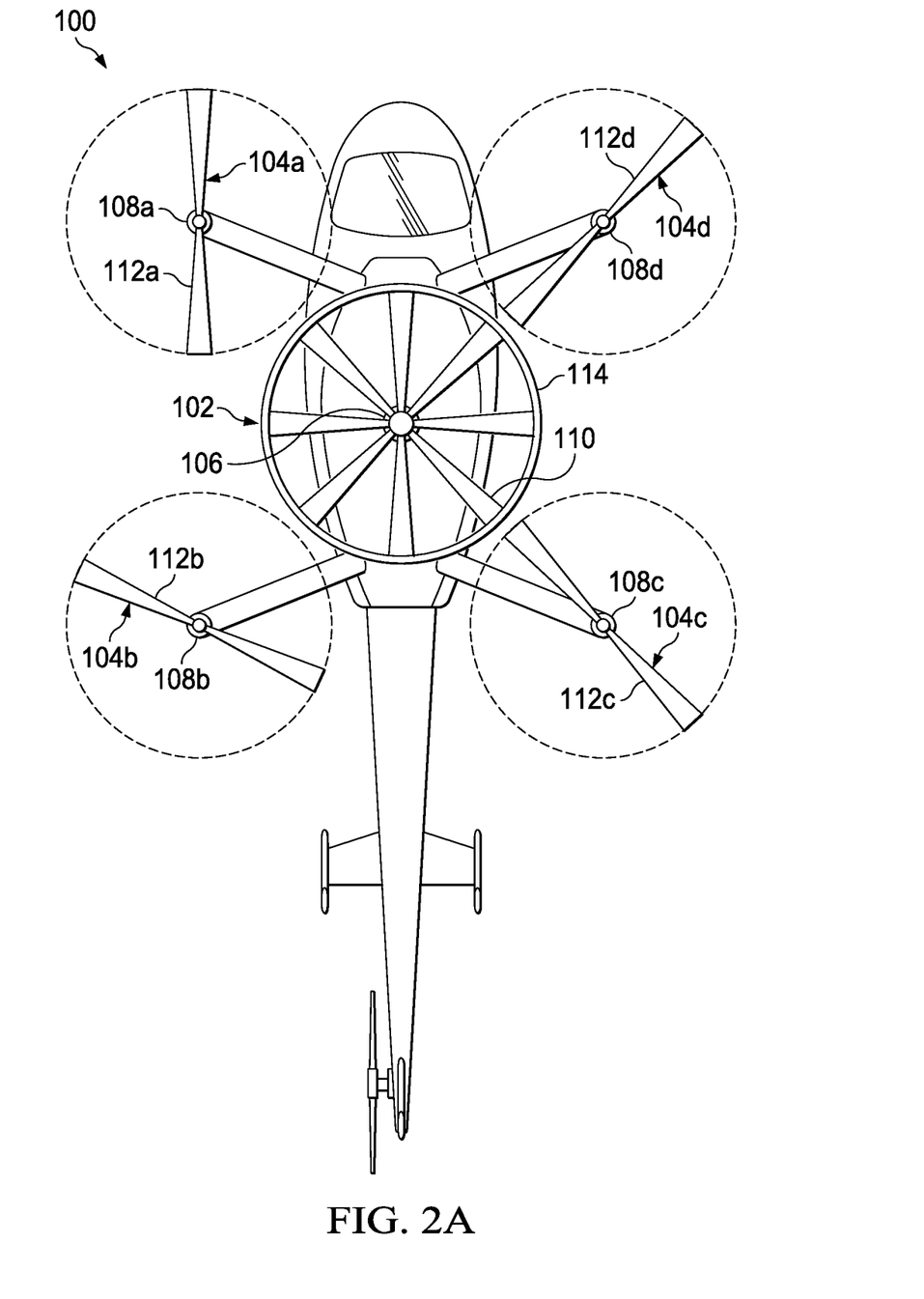
FIGS. 2A-2B are top views of rotorcraft including propulsion systems in accordance with embodiments of the present disclosure.
Figure 2B:
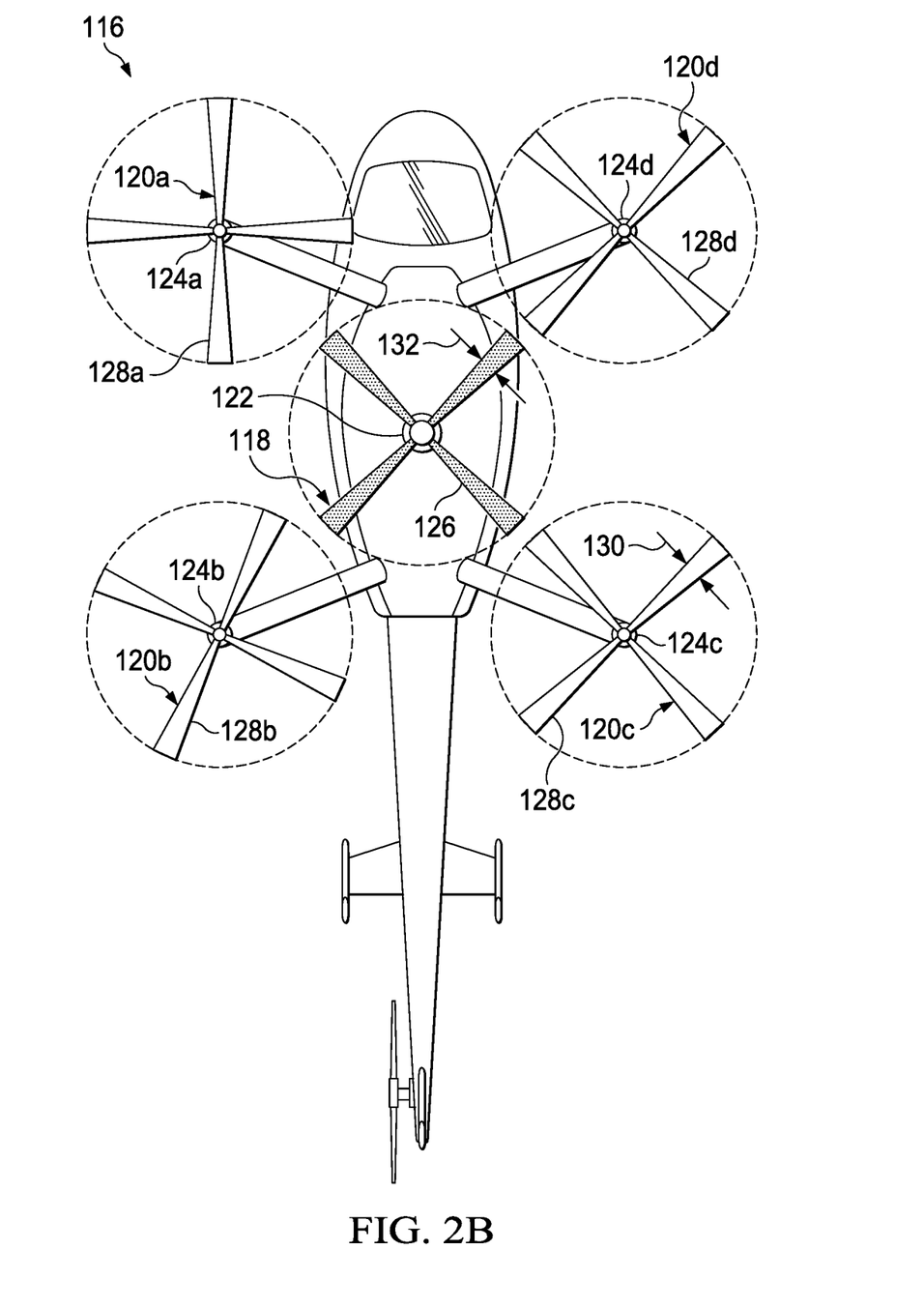

Referring to FIGS. 2A-2B in the drawings, various propulsion system configurations are shown by which to differentiate the rotational inertias of the fan assemblies therein. Referring to FIG. 2A, rotorcraft 100 includes high inertia fan assembly 102, which is centrally located between low inertia fan assemblies 104a, 104b, 104c, 104d. Low inertia fan assemblies 104a, 104b, 104c, 104d are radially symmetric about high inertia fan assembly 102. Each fan assembly 102, 104a, 104b, 104c, 104d includes a motor 106, 108a, 108b, 108c, 108d and fan blades 110, 112a, 112b, 112c, 112d, respectively. High inertia fan assembly 102 has a higher rotational inertia than low inertia fan assemblies 104a, 104b, 104c, 104d. While fan blades 110 and fan blades 112a, 112b, 112c, 112d each have the same length, high inertia fan assembly 102 includes a larger number of fan blades 110. High inertia fan assembly 102 includes eight fan blades and low inertia fan assemblies 104a, 104b, 104c, 104d each include two fan blades, although the exact number of fan blades may differ depending on the embodiment. Because high inertia fan assembly 102 includes a larger number of fan blades, fan blades 110 collectively have a higher rotational inertia, have a lower angular acceleration and are capable of producing a higher maximum thrust than fan blades 112a, 112b, 112c, 112d of each low inertia fan assembly 104a, 104b, 104c, 104d. Also contributing to the higher rotational inertia of high inertia fan assembly 102 is circumferential tip ring 114 coupled to the outboard tips of fan blades 110 and rotatable with high inertia fan assembly 102. Circumferential tip ring 114 may help reduce tip and efficiency losses, increase thrust performance and reduce the noise produced by high inertia fan assembly 102. Circumferential tip ring 114 may also help to reduce the edgewise flow on fan blades 110 during flight, which can cause undesirable forces to act upon rotorcraft 100.

Referring to FIG. 2B, rotorcraft 116 includes high inertia fan assembly 118, which is centrally located between low inertia fan assemblies 120a, 120b, 120c, 120d. Low inertia fan assemblies 120a, 120b, 120c, 120d are radially symmetric about high inertia fan assembly 118. Each fan assembly 118, 120a, 120b, 120c, 120d includes a motor 122, 124a, 124b, 124c, 124d and fan blades 126, 128a, 128b, 128c, 128d, respectively. High inertia fan assembly 118 has a higher rotational inertia than low inertia fan assemblies 120a, 120b, 120c, 120d. Despite fan blades 126, 128a, 128b, 128c, 128d each having the same length, high inertia fan assembly 118 achieves a higher rotational inertia than low inertia fan assemblies 120a, 120b, 120c, 120d by virtue of fan blades 126 being formed from a different material than fan blades 128a, 128b, 128c, 128d. In particular, fan blades 128a, 128b, 128c, 128d are formed from a lighter material than fan blades 126. In one non-limiting example, fan blades 126 may be formed from an aluminum or aluminum alloy material and fan blades 128a, 128b, 128c, 128d may be formed from a lighter composite or carbon-based material. Such composite or carbon-based materials may be more expensive than the material from which fan blades 126 are formed. If cost is a compelling design constraint, composite, carbon-based or other expensive materials may be more sparingly used throughout the fan assemblies of rotorcraft 116. In some embodiments, fan blades 128a, 128b, 128c, 128d may be formed from a low inertia and low strength material and fan blades 126 may be formed from a high inertia and high strength material.

In some embodiments, fan blades 126 of high inertia fan assembly 118 may include tip weights to increase the rotational inertia of fan blades 126, which may also assist high inertia fan assembly 118 in performing an autorotation maneuver. The rotational inertias of fan assemblies 118, 120a, 120b, 120c, 120d may also be differentiated from one another by varying the widths of fan blades 128a, 128b, 128c, 128d relative to fan blades 126. For example, width 130 of fan blades 128a, 128b, 128c, 128d may be smaller than width 132 of fan blades 126. The rotational inertias of fan assemblies 118, 120a, 120b, 120c, 120d may also be differentiated from one another by varying the surface areas of fan blades 128a, 128b, 128c, 128d relative to fan blades 126. The widths and surface areas of fan blades 126, 128a, 128b, 128c, 128d may differ whether or not fan blades 126, 128a, 128b, 128c, 128d are formed from the same material. In the illustrative embodiments, the fan blades of the high inertia fan assemblies may have a higher collective mass than the fan blades of the low inertia fan assemblies by virtue of being longer, wider, more numerous, larger or heavier or by virtue of any other physical attribute.

Figure 3A:
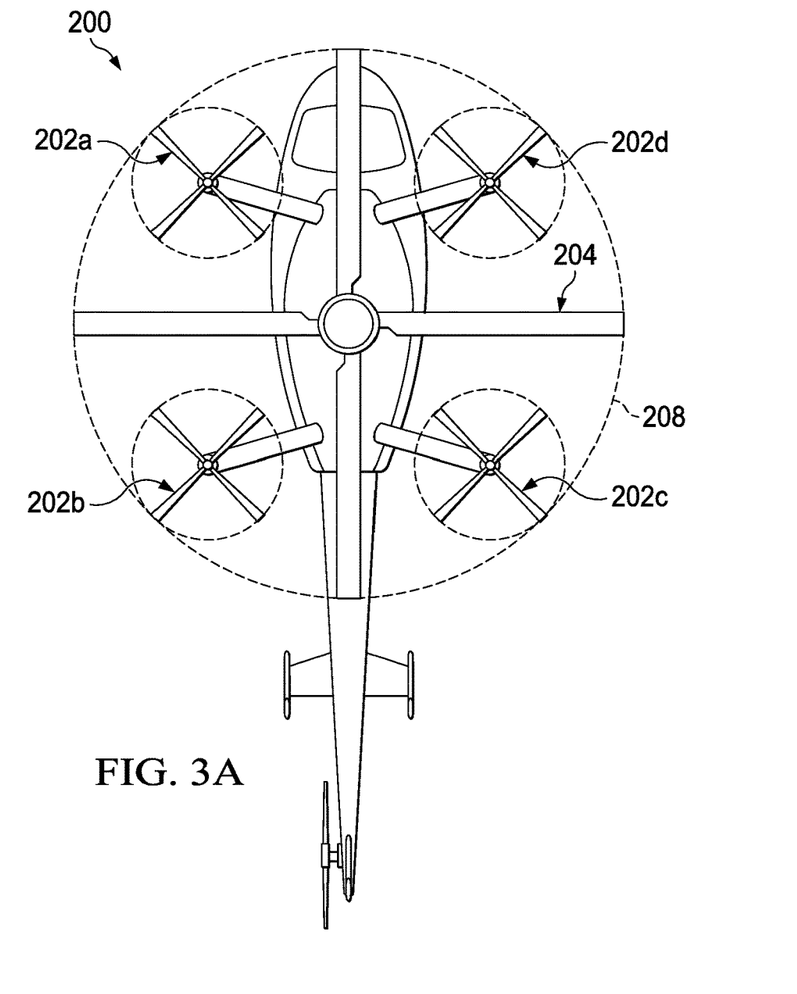
FIGS. 3A-3F are various views of rotorcraft including propulsion systems in accordance with embodiments of the present disclosure.
Figure 3B:
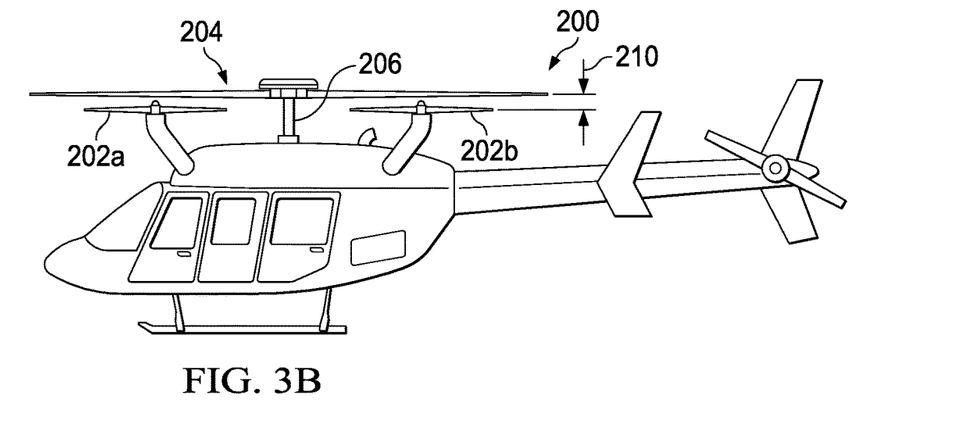

Referring to FIGS. 3A-3F in the drawings, various propulsion system configurations for a rotorcraft are schematically illustrated. Referring to FIGS. 3A-3B, rotorcraft 200 includes four low inertia fan assemblies 202a, 202b, 202c, 202d and a centrally-located high inertia fan assembly 204 each having respective fan blades rotated by a respective motor. Low inertia fan assemblies 202a, 202b, 202c, 202d are radially symmetric about mast 206 of high inertia fan assembly 204. High inertia fan assembly 204 has a higher rotational inertia than low inertia fan assemblies 202a, 202b, 202c, 202d. Low inertia fan assemblies 202a, 202b, 202c, 202d are disposed underneath rotor disk 208 of high inertia fan assembly 204. Therefore, low inertia fan assemblies 202a, 202b, 202c, 202d are within the rotor wash of high inertia fan assembly 204. While low inertia fan assemblies 202a, 202b, 202c, 202d are illustrated as inboard of the outer circumference of rotor disk 208, low inertia fan assemblies 202a, 202b, 202c, 202d may also be partially or fully outboard of the outer circumference of rotor disk 208. Low inertia fan assemblies 202a, 202b, 202c, 202d may be disposed any distance 210 beneath high inertia fan assembly 204. In other embodiments, the distances between high inertia fan assembly 204 and each low inertia fan assembly 202a, 202b, 202c, 202d may be non-uniform.

Figure 3C:
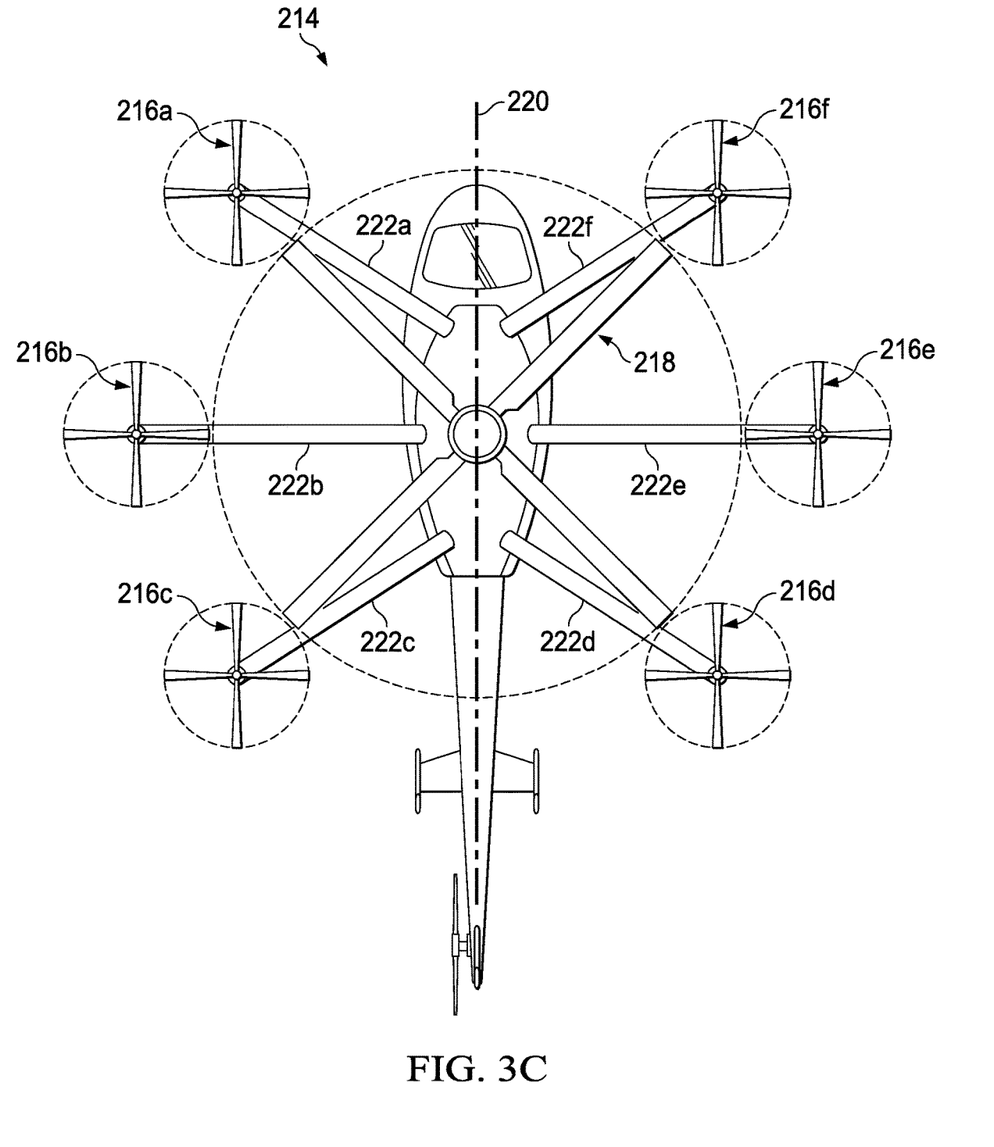

Referring to FIG. 3C, rotorcraft 214 includes six low inertia fan assemblies 216a, 216b, 216c, 216d, 216e, 216f and a centrally-located high inertia fan assembly 218 each having respective fan blades rotated by a respective motor. Low inertia fan assemblies 216a, 216b, 216c, 216d, 216e, 216f are symmetric about bisecting longitudinal axis 220 of rotorcraft 214. High inertia fan assembly 218 has a higher rotational inertia than low inertia fan assemblies 216a, 216b, 216c, 216d, 216e, 216f. Rotorcraft 214 may have any ratio of low inertia fan assemblies to high inertia fan assemblies, such as 2:1, 3:1, 4:1, 4:2, 6:1, 3:2, 9:1, 1:2, 1:3, 1:4, 2:4, 1:6, 2:3, 9:1 or any other ratio. Cranes 222a, 222b, 222c, 222d, 222e, 222f each support a single respective low inertia fan assembly 216a, 216b, 216c, 216d, 216e, 216f, but in other embodiments each crane 222a, 222b, 222c, 222d, 222e, 222f may support more than one fan assembly.

Figure 3D:
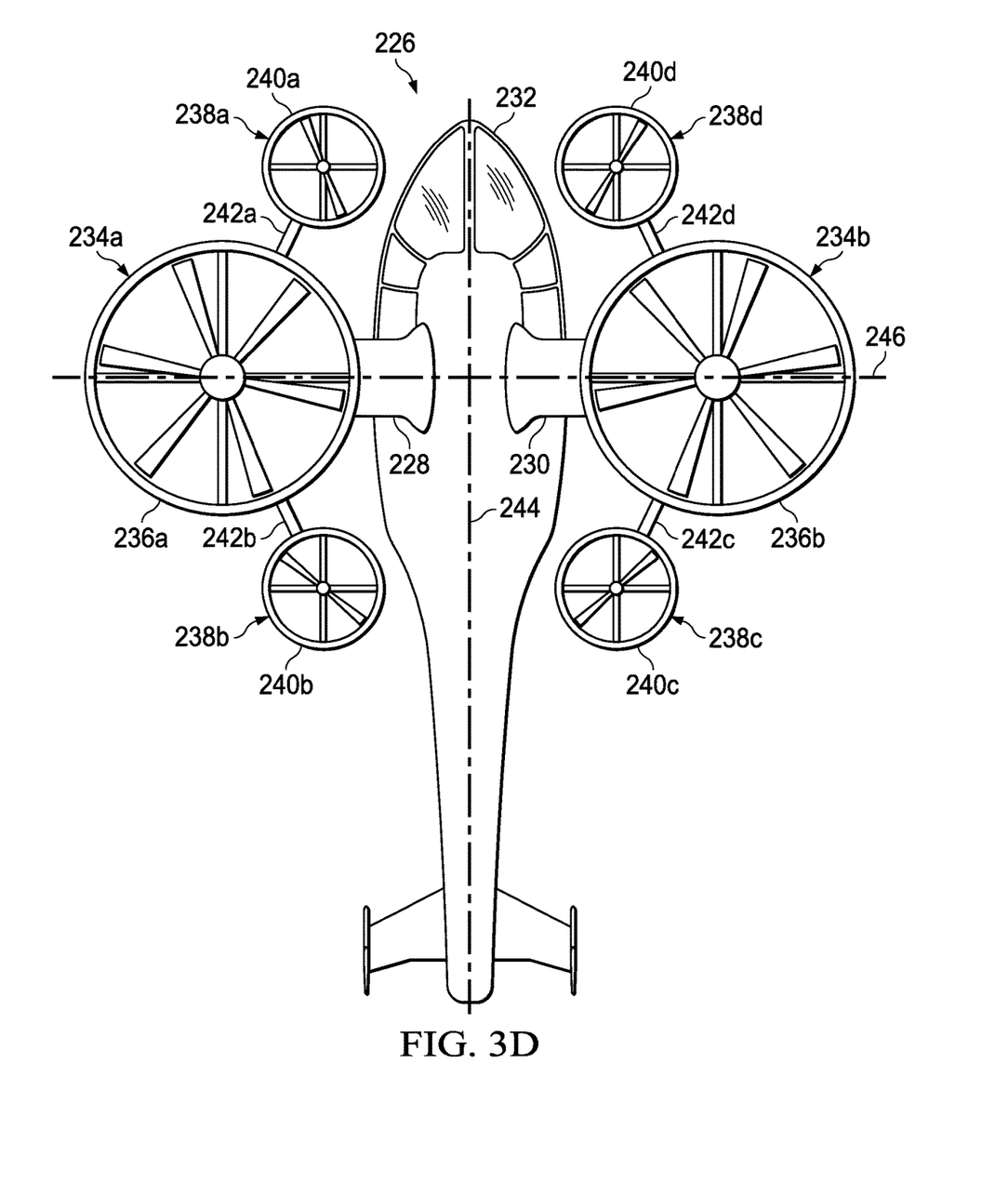

Referring to FIG. 3D, rotorcraft 226 includes wings 228, 230 supported by fuselage 232. High inertia fan assemblies 234a, 234b are rotatably coupled to the outboard ends of wings 228, 230, and each include a shroud, or duct, 236a, 236b, respectively. Low inertia fan assemblies 238a, 238b, 238c, 238d also include a respective shroud, or duct, 240a, 240b, 240c, 240d. Shrouds 240a, 240b of low inertia fan assemblies 238a, 238b are coupled to shroud 236a of high inertia fan assembly 234a by connection members 242a, 242b, respectively. Low inertia fan assemblies 238a, 238b may be fixed or tiltable relative to high inertia fan assembly 234a depending on the embodiment. Shrouds 240c, 240d of low inertia fan assemblies 238c, 238d are coupled to shroud 236b of high inertia fan assembly 234b by connection members 242c, 242d, respectively. Low inertia fan assemblies 238c, 238d may be fixed or tiltable relative to high inertia fan assembly 234b depending on the embodiment. Fan assemblies 234a, 234b, 238a, 238b, 238c, 238d each have respective fan blades rotated by a respective motor. Fan assemblies 234a, 234b, 238a, 238b, 238c, 238d are symmetric about bisecting longitudinal axis 244 of rotorcraft 226. High inertia fan assemblies 234a, 234b have a higher rotational inertia than low inertia fan assemblies 238a, 238b, 238c, 238d. High inertia fan assemblies 234a, 234b may be tiltable relative to fuselage 232 about tilt axis 246, thus allowing fan assemblies 234a, 234b, 238a, 238b, 238c, 238d to provide thrust in multiple directions. In at least this respect, rotorcraft 226 may be a tiltrotor aircraft in which fan assemblies 234a, 234b, 238a, 238b, 238c, 238d provide thrust for both vertical takeoff and landing (VTOL) and forward flight depending on the tilt orientation of fan assemblies 234a, 234b, 238a, 238b, 238c, 238d. Although all fan assemblies 234a, 234b, 238a, 238b, 238c, 238d are shrouded in the illustrated embodiment, rotorcraft 226 may include any ratio of open fan assemblies to shrouded fan assemblies. For example, low inertia fan assemblies 238a, 238b, 238c, 238d may instead be open fan assemblies. Also, although low inertia fan assemblies 238a, 238b, 238c, 238d are coupled to shrouds 236a, 236b, low inertia fan assemblies 238a, 238b, 238c, 238d may instead be coupled directly to fuselage 232 or another portion of rotorcraft 226.

Figure 3E:
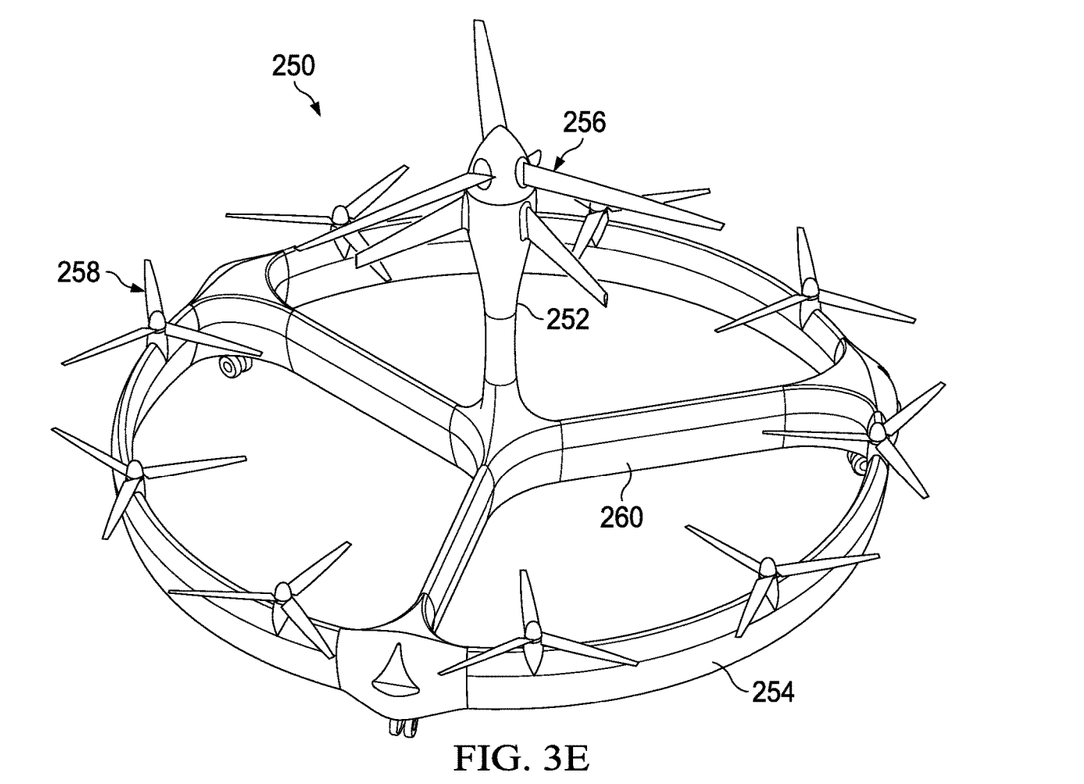
Figure 3F:
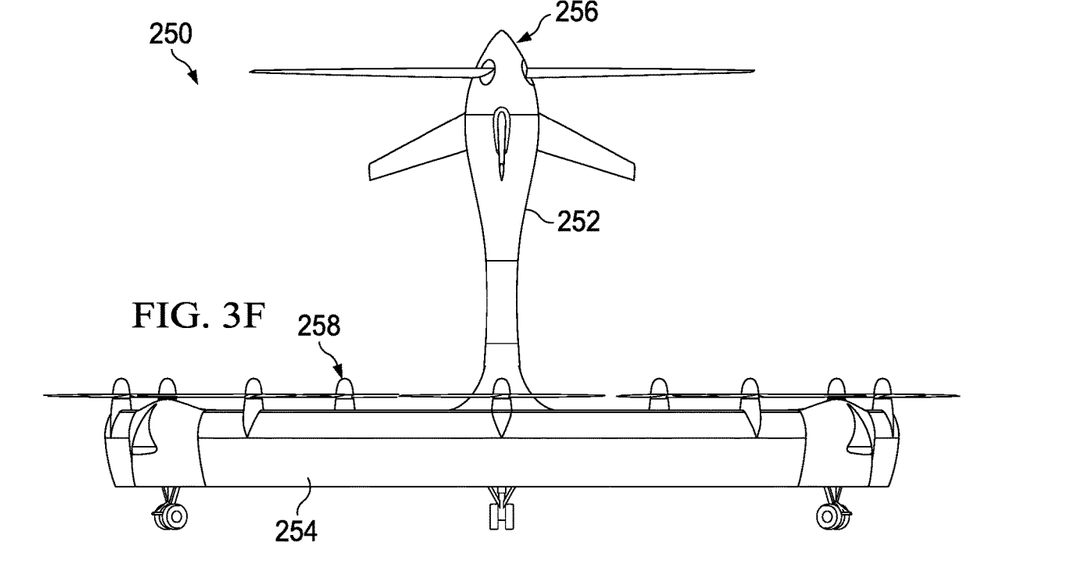

Referring to FIGS. 3E-3F, unmanned rotorcraft 250 includes fuselage 252 surrounded by a closed wing 254. High inertia fan assembly 256 is rotatably coupled to fuselage 252 and low inertia fan assemblies 258 are rotatably coupled to closed wing 254. Closed wing 254 is coupled to fuselage 252 by spokes 260. Fan assemblies 256, 258 are each open fan assemblies and have respective fan blades rotated by a respective electric or hydraulic motor. High inertia fan assembly 256 has a higher rotational inertia than low inertia fan assembly 258. While nine low inertia fan assemblies 258 and a single high inertia fan assembly 256 are shown in the illustrated embodiment, rotorcraft 250 may include any number of low or high inertia fan assemblies depending on the requirements and desired attributes of the rotorcraft. In some embodiments, high inertia fan assembly 256 may include variable pitch fan blades. Also, any number of fan assemblies 256, 258 may be shrouded instead of open. In other embodiments, spokes 260 may also include fan assemblies rotatably coupled thereto.

The flight control computers of the present embodiments preferably include computing elements such as non-transitory computer readable storage media that include computer instructions executable by processors for controlling flight operations. The computing elements may be implemented as one or more general-purpose computers, special purpose computers or other machines with memory and processing capability. The computing elements may include one or more memory storage modules including, but is not limited to, internal storage memory such as random access memory, non-volatile memory such as read only memory, removable memory such as magnetic storage memory, optical storage, solid-state storage memory or other suitable memory storage entity. The computing elements may be implemented as microprocessor-based systems operable to execute program code in the form of machine-executable instructions. The computing elements may be selectively connectable to other computer systems via a proprietary encrypted network, a public encrypted network, the Internet or other suitable communication network that may include both wired and wireless connections.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion system for a rotorcraft comprising:
   a first fan assembly including a central fan and a mast, the central fan including a plurality of first fan blades;
   a plurality of second fan assemblies each including a plurality of second fan blades, the second fan assemblies radially symmetric about the mast of the central fan assembly; and
   a drive system adapted to provide torque to the first and second fan blades;
   wherein, the first fan blades have a larger rotational inertia than the second fan blades;
   wherein, the central fan forms a rotor disk and the second fan assemblies are disposed outboard of the rotor disk of the central fan;
   wherein, the second fan blades are formed from a different and lighter material than the first fan blades; and
   wherein, the second fan blades are adapted to experience a larger angular acceleration than the first fan blades in response to torque from the drive system, thereby providing responsive thrust control for the rotorcraft.

2. The propulsion system as recited in claim 1 wherein the first fan blades are formed from a higher strength material than the second fan blades.

3. The propulsion system as recited in claim 1 wherein the first fan blades further comprise aluminum and the second fan blades further comprise at least one of a carbon-based material or a composite material.

4. The propulsion system as recited in claim 1 wherein the first fan blades further comprise tip weights.

5. The propulsion system as recited in claim 1 wherein the central fan assembly further comprises a single central fan assembly.

6. The propulsion system as recited in claim 1 wherein the first and second fan blades further comprise fixed pitch fan blades.

7. The propulsion system as recited in claim 1 wherein the plurality of first fan blades includes a larger number of fan blades than the plurality of second fan blades.

8. The propulsion system as recited in claim 1 wherein the first fan blades are wider than the second fan blades.

9. The propulsion system as recited in claim 1 wherein the first fan blades further comprise a circumferential tip ring.

10. The propulsion system as recited in claim 1 wherein at least one of the first or second fan assemblies further comprise a shrouded fan assembly.

11. The propulsion system as recited in claim 1 wherein the drive system further comprises at least one electric motor.

12. The propulsion system as recited in claim 1 wherein the drive system further comprises at least one variable speed motor.

13. The propulsion system as recited in claim 1 wherein the drive system further comprises a plurality of electric motors adapted to provide torque to the second fan blades.

14. A rotorcraft comprising:
a fuselage;
a tailboom extending from the fuselage;
a tail rotor rotatably coupled to an aft portion of the tailboom and configured to provide yaw control for the rotorcraft; and
a propulsion system coupled to the fuselage, the propulsion system comprising:
a first fan assembly including a central fan and a mast, the central fan including a plurality of first fan blades;
a plurality of second fan assemblies each including a plurality of second fan blades, the second fan assemblies radially symmetric about the mast of the central fan assembly; and
a drive system adapted to provide torque to the first and second fan blades;
wherein, the first fan blades have a larger rotational inertia than the second fan blades;
wherein, the central fan forms a rotor disk and the second fan assemblies are disposed outboard of the rotor disk of the central fan;
wherein, the second fan blades are formed from a different and lighter material than the first fan blades; and
wherein, the second fan blades are adapted to experience a larger angular acceleration than the first fan blades in response to torque from the drive system, thereby providing responsive thrust control for the rotorcraft.

15. The rotorcraft as recited in claim 14 wherein the central fan assembly and the second fan assemblies are disposed in substantially the same plane.

16. The rotorcraft as recited in claim 14 wherein the first fan blades of the central fan assembly further comprise variable pitch fan blades; and
wherein the second fan blades of the second fan assemblies further comprise fixed pitch fan blades.

17. The rotorcraft as recited in claim 14 wherein the first fan blades are formed from a higher strength material than the second fan blades.

18. The rotorcraft as recited in claim 14 wherein the first fan blades further comprise aluminum and the second fan blades further comprise at least one of a carbon-based material or a composite material.

19. The rotorcraft as recited in claim 14 wherein the first fan blades further comprise tip weights.

20. The rotorcraft as recited in claim 14 wherein the central fan assembly further comprises a single central fan assembly.

* * * * *